United States Patent [19]
Noble

[11] Patent Number: 5,333,436
[45] Date of Patent: Aug. 2, 1994

[54] MODULAR ANTENNA POLE
[75] Inventor: Myron C. Noble, Plymouth, Ind.
[73] Assignee: PiRod, Inc., Plymouth, Ind.
[21] Appl. No.: 944,258
[22] Filed: Sep. 14, 1992
[51] Int. Cl.⁵ .......................................... E04H 12/00
[52] U.S. Cl. .............................. 52/726.3; 52/726.1; 403/337
[58] Field of Search ............... 52/726.1, 726.3, 726.4; 403/335, 337; 285/368, 412

[56] References Cited
U.S. PATENT DOCUMENTS

| | | | |
|---|---|---|---|
| 7,412 | 6/1850 | Fisher | 52/726.1 |
| 578,524 | 3/1897 | Reid | 52/726.3 |
| 2,250,448 | 7/1941 | Edwards | 403/337 |
| 2,369,533 | 2/1945 | Cohen | 52/726.3 |
| 2,412,678 | 12/1946 | Goldman | 52/726.3 |
| 3,345,826 | 10/1967 | Hignite | 52/726.3 |
| 3,421,781 | 1/1969 | Spurk | 52/726.1 |
| 4,086,012 | 4/1978 | Buckley et al. | 403/337 |
| 4,721,008 | 1/1988 | Stoops et al. | 403/337 |

*Primary Examiner*—Carl D. Friedman
*Assistant Examiner*—Wynn Wood
*Attorney, Agent, or Firm*—James D. Hall

[57] ABSTRACT

This invention relates to an improved modular antenna pole and to a unique and novel method of joining the pre-fabricated sections which, when assembled, constitute the pole. The pole is comprised of a series of cylindrical sections of decreasing diameters having flanges so designed that the bottom flange of a next succeeding higher section, secured to the outside of the cylindrical section, mates with the top flange of the adjacent lower section, which flange is secured to the inside thereof. Consequently, the pole may be "tapered" from bottom to top in progressively smaller incremental steps rather than by tapering each successive section.

6 Claims, 4 Drawing Sheets

MODULAR ANTENNA POLE

SUMMARY OF THE INVENTION

This invention relates to modular poles and will have particular application to antenna poles which are of substantial height.

Antenna poles have long been used for the transmission, reception and forwarding of radio and television signals. In addition, microwave antennas have come into frequent demand and usage. Such poles generally are of a height in the range of from 80 to 220 feet and more.

In the past, these poles have been constructed of metal tubing or bars fabricated together like webbing and generally open, so as not to form a wind barrier. These poles have a complex series of tie-down cables, or, guy wires, suspended from varying heights to large anchoring weights. Because of the cable supports, the area required for such poles is rather large, since cables must be extended from three or four sides of the pole and extend horizontally from the pole a distance nearly equal to the height the pole.

To overcome these problems, there have been developed modular poles. These poles, however, are extremely expensive because they are built using tapered segments, each of which has a lesser diameter at its top then at its bottom. It is also difficult to secure such segments one to another.

The pole of this invention is designed to overcome these prior problems. It is made up of several individual segments, but each is cylindrical in shape, with the bottom being of the same diameter as the top. By a unique coupling system, the details of which will subsequently be explained, the segments "step down" in an upwardly progressive fashion, each segment smaller than the one below to reach a desired height.

With this design, coupled with the unique securing or coupling system, there is no need for guy wires or other external supports. All that is needed is a solid, substantial base, to which to secure the bottom segment of the pole. This design further includes a unique coupling means between the top segment of the pole and the antenna which permits the antenna to be rotated to adjust its horizontal alignment.

Accordingly, it is an object of this invention to provide a novel structure for a modular antenna pole having multiple segments.

Another object is to provide a stronger modular antenna pole with a unique and improved coupling means for securing the multiplicity of segments which make up the pole.

A further object is to provide a novel coupling means between the uppermost segment of the pole and the antenna mounted thereon which permits rotation of the antenna.

Another object is to provide a modular antenna pole which has greater strength and rigidity, which is more economical to fabricate and to erect and which can be more efficiently erected.

Other objects will become apparent upon a reading of the following description.

BRIEF DESCRIPTION OF THE DRAWINGS

A preferred embodiment of the invention has been depicted for purposes of illustration wherein.

DESCRIPTION OF THE PREFERRED EMBODIMENTS

The preferred embodiment herein described are not intended to be exhaustive or to limit the invention to the precise forms disclosed. They are chosen and described to illustrate the principles of the invention and its application and practical use to enable others skilled in the art to utilize its teachings.

Figure 1:
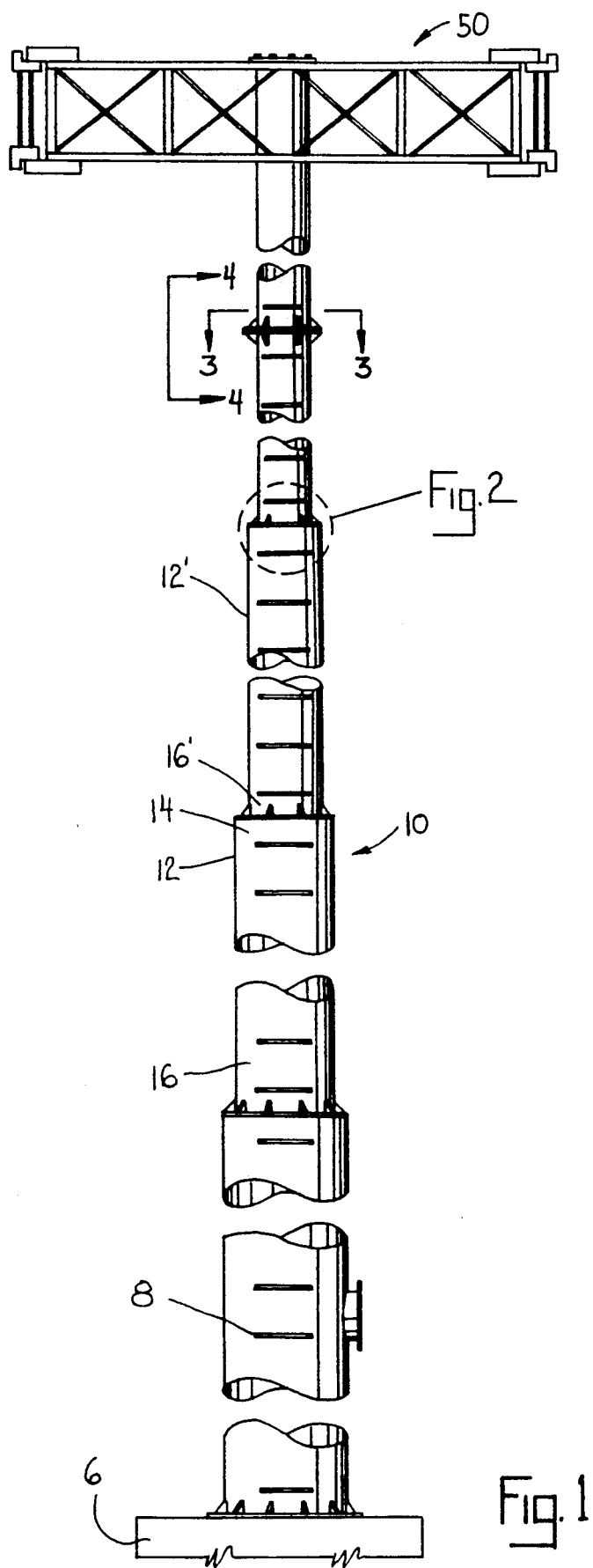
FIG. 1 is a fragmentary elevational view of the modular pole of this invention.

Referring first to FIG. 1, reference numeral 10 generally designates the modular antenna pole of this invention. As explained above, any number of types and styles of what are generally referred to in the trade as "candelabra" may be fixed to the top of pole 10. In the illustration, conventional antenna 50 is depicted.

Although the pole is illustrated in fragmentary fashion, the joints between cylindrical segments and the step-down in size may be appreciated. The principle involved is applicable to each joint, the difference being the actual diameter of each cylinder. Therefore, only two joints will be fully explained in detail, it being understood that the same is applicable to all joints. Further, it will be understood that the number of segments and the number of joints is variable, dependent upon the desired height of the pole.

The amount of the step-down is critical, from the standpoint of strength and rigidity, but is not finite. For example, one can step down a foot between segments; ideally, however, the step-down is in the general range of 3-4 inches. Likewise, the length of each cylindrical segment has practical limitation, also for purposes of strength and rigidity. It has been found that a length of approximately 20 feet provides all of the desired characteristics, but this, too, may be varied, depending on individual circumstances.

Illustrated on FIG. 1 are a series of equally spaced horizontal lines 8, along the entire length of the pole. These represent rungs, which are used by workers who climb the pole, and are included merely to effect the realism of the illustration.

Referring again to the figures, cylindrical segment 12 has a constant diameter from top 14 to bottom 16. At bottom 16 of segment 12 is found bottom flange 18. At top 14 of segment 12 is found top flange 20.

Each flange is in the shape of a ring, which includes bolt bores 22. For sake of explanation, let us commence with top ring 20, because at the very base of pole 10, the bottom cylindrical cylinder is securely fixed to a Ground anchor (not shown) which consists of a very heavy concrete slab 6.

It will be understood that each cylindrical segment is fabricated in a shop and transported to the erection site.

Top ring 20 is of the same outside diameter as the inside diameter of cylindrical segment 12. Top ring 20 is welded to top 14 of segment 12, approximately one inch from the rim thereof.

For purposes of structural strength, a multiple number of gussets 24 are welded to the bottom of ring 20 and extend downwardly along the interior wall of segment 12, to which they are welded.

While on the ground, full threaded hex bolts 26 are inserted upwardly through bolt bores 22 of top ring 20. Each bolt 26 is secured to top ring 20 by application of hex jam nut 28. Each bolt 26 is of such a length that it extends approximately 2½ inches above the top rim of segment 12.

Figure 2:
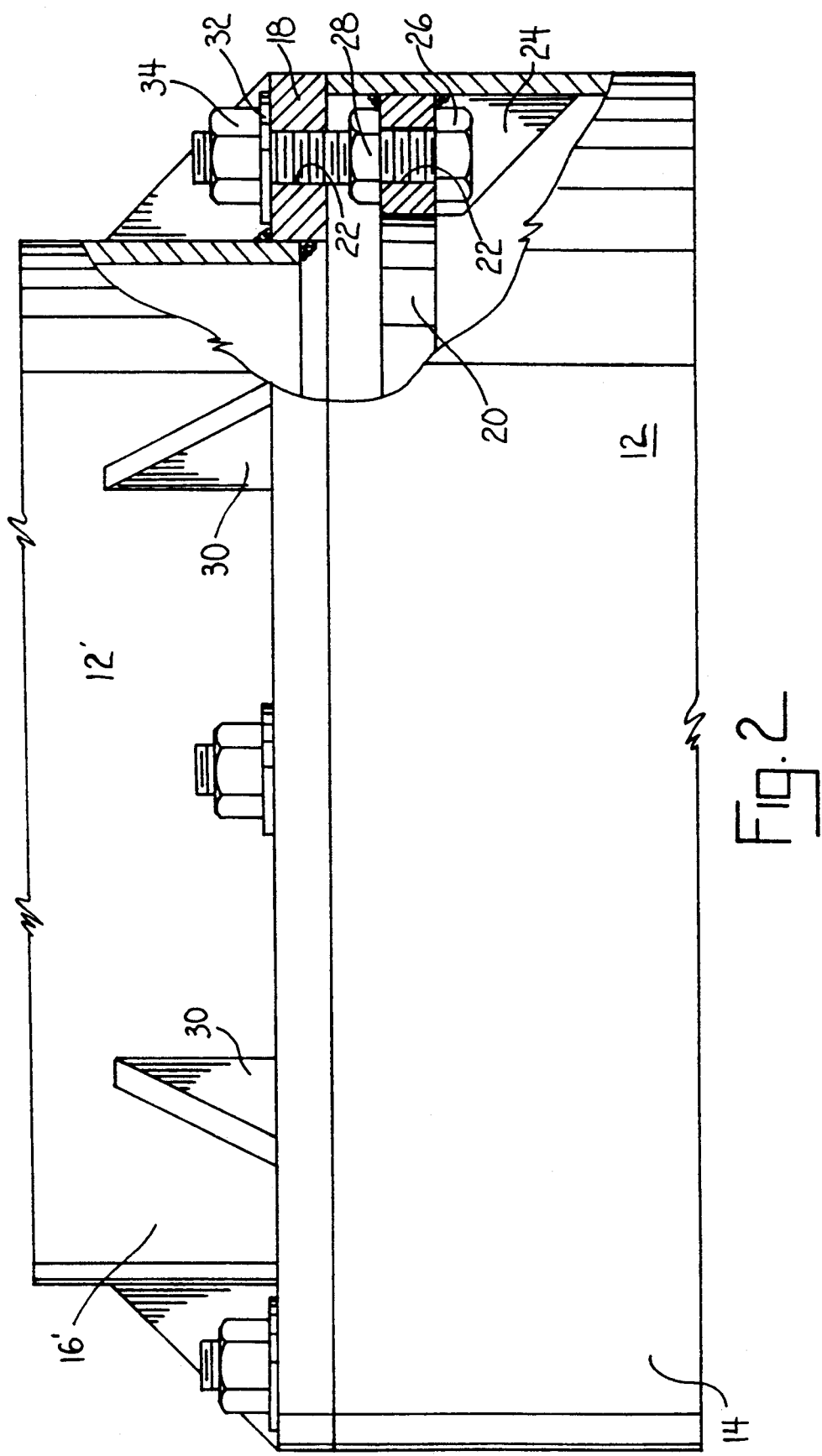
FIG. 2 is a detailed view of one of the step-down joints shown encircled in FIGS. 2 and with a portion in sectioned form, illustrating the coupling of two adjacent segments.

To the bottom of the next segment 12' in the structural sequence is welded bottom ring 18. The inside diameter of ring 18 is the same as the outside diameter of segment 12', bearing in mind that the diameter of segment 12' is less than the diameter of segment 12. The outside diameter of ring 18 approximates the outside diameter of segment 12, as best illustrated in FIG. 2.

As stated above, ring 18 is welded to the bottom of segment 12'. Welded to ring 18 and extending upwardly along the outer surface of segment 12' are a plurality of gussets 30. Gussets 30 ape welded to segment 12' for purposes of structural strength.

Although rings 18 and 20 are not exactly the same diameter, it should be understood that ring 18 overlaps ring 20. Ring 18 has bored through it bolt bores 22 which are located on a circular arc identical to those on ring 20 and complementary thereto. In other words, each ring 18, 20 has the identical number of bolt bores 22 in exact correspondence.

It will of course be understood that the number of bolt bores and the number of gussets will be dependent upon the diameters of the respective adjacent segments of the pole. Although only a few of each are illustrated, it will be appreciated that as many as 50–60 of each may be employed in the lower portion of the pole.

Figure 4:
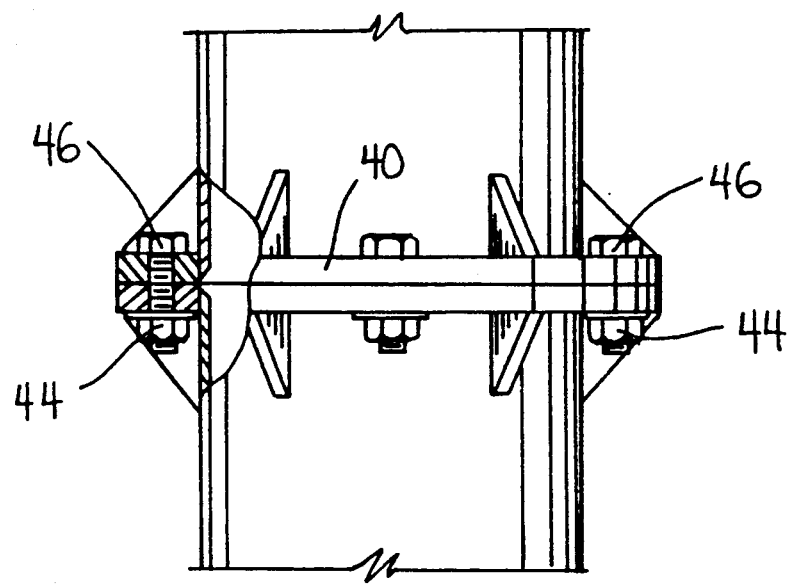
FIG. 4 is a detailed view of the connection between the pole structure and the antenna structure, seen along line 4—4 of FIG. 1 and with a portion in sectional form.

When cylindrical segment 12' is lowered toward previously erected cylindrical segment 12, all of bolts 26 protruding above the rim at segment 12 correspond with and fit through bores 22 of ring 18 of segment 12'. When so mated, flat washers 32 and lock nuts 34 are secured.

when the uppermost extent of pole 10 is reached, the diameters of segments 12 may be reduced to, as a matter of example, a foot. It then becomes impractical to have rings 20 welded interiorally. Both top and bottom rings are the configuration of bottom ring 18, gussets 30 being situated on and welded to the outer surface of the segments, as best seen in FIG. 4. Furthermore, it will be appreciated that, even in the lowermost segments, if two adjacent segments of the same diameter are utilized, they may be secured together in like fashion, rather than be stepped.

Figure 3:
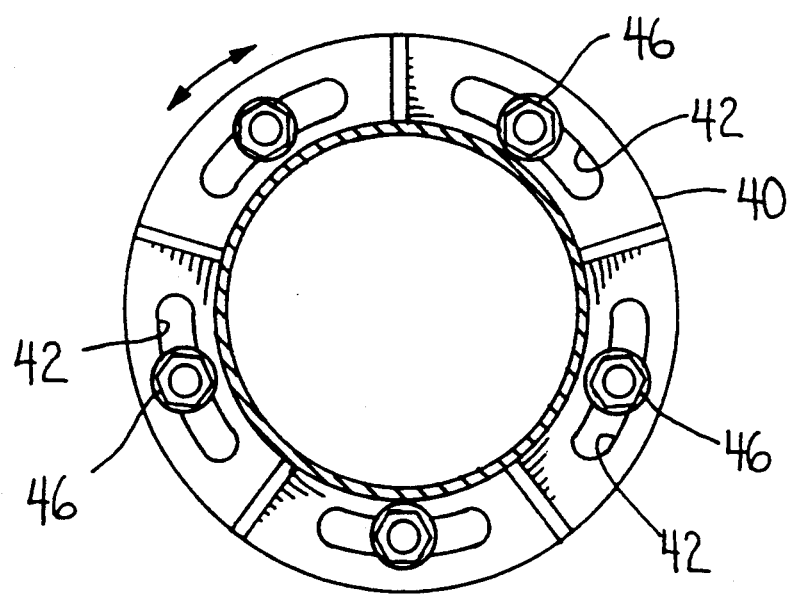
FIG. 3 is a cross-sectional view of the structure of FIG. 1, taken along line 3—3 thereof.
Figure 5:
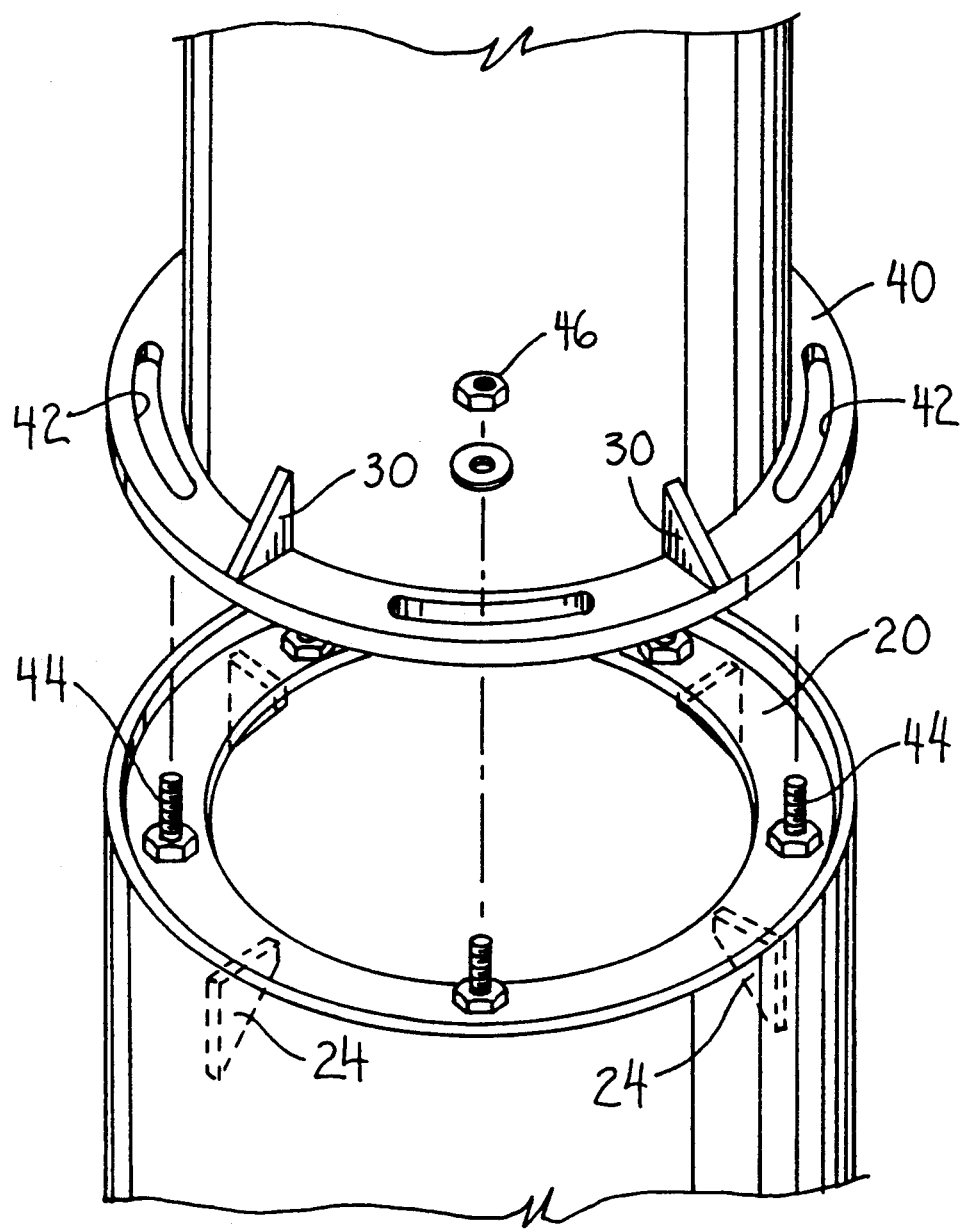
FIG. 5 is an exploded perspective view of an alternative way of connecting the antenna structure to the pole structure.

The very top ring 40 is, in affect, the platform for antenna 50. The complexity and size of the top flange will depend upon the size and weight of the antenna which is to be supported. If it is desired that antenna 50 be rotatably adjustable, plate 40, illustrated in FIG. 3 will be utilized. Dimensional constraints are then imposed upon the uppermost flange which themselves do now form a part of this invention. It will be appreciated that FIG. 5 illustrates an alternate method of securing mount plates 40 and antenna 50 to the top of pole 10.

As in the lower structure the placement of the bolts becomes critical. From the very top of the support will protrude five bolts 44, which will fit through slots 42 in rotatable mount plate 40. Prior to securement, antenna 50 will be lowered onto the appropriate base and the lock nuts applied, but not tightly secured. Antenna 50 may then be rotated into its exact and most effective position, at which time lock nuts 46 are fully turned for securement.

It will be understood that the "step-down" in an upward direction of the cylindrical sections is the crux of this invention. However, the invention is not to be limited to a step-down which is restricted to a given increment of progression. There may be instances where there is a heavy array at, e.g., the midpoint of the pole and a light load at the top.

In such a case, through the insertion of an additional ring or an appropriate flange, the step-down may be as much as one foot or more. Under normal circumstances, it has been found that a step-down of six inches in diameter is optimum. It should not be less, due to the sizes of the bolts and nuts, coupled with the needed strength and stability, but it can be greater without weakening the structure or departing from the invention.

The benefits, advantages and unique features of this invention will become apparent when considered in conjunction with an explanation of the steps taken in the fabrication and erection of a typical modular antenna pole, fabricated within the scope of this invention.

will be understood that such a pole may be of a height of 80 to 220 feet or more, that it is fabricated from heavy gauge steel, that the bottom cylindrical segment may be of a diameter of 5 feet or more and that the uppermost segment may be of a diameter of as little as 8 inches, but should not be less depending upon the weight and mass of the antenna structure to be mounted at the top. Each cylindrical segment may be a length of up to 20 feet, should not be longer, but may be shorter.

A concrete base is first laid, having a depth of up to 5 feet or more into which are imbedded a circle of anchor bolts protruding upwardly =through a base flange. By way of example and not of limitation, it has been found that approximately 48 one inch diameter bolts will satisfactorily support a pole having a 5 foot diameter base segment. It will of course be understood that the numbers of connecting bolts for all flanges is dependent on a number of factors and is determined through standard engineering and structural calculations which are not a part of this invention.

All of the individual sections have been fabricated in the shop and transported to the erection site. The rings have been welded to the sections and the bolts have been inserted into the top ring of all of the sections.

For assembly, the second cylindrical section is lifted by, e.g., a crane, into position and lowered until the bores of the ring on the bottom mate with the bolts protruding from the top of the lower cylindrical section.

This procedure is followed until the desired height is reached. When it is desired to incorporate the rotatable adjustment feature, the rings for that mounting are secured to the top and the rotating mount is attached.

It is understood that the above description does not limit the invention to the precise form disclosed but may be modified within the scope of the appended claims.

What is claimed is:

1. A modular pole comprising a series of aligned cylindrical sections of upwardly decreasing diameters whereby adjacent cylindrical sections are attached one to the other by flanges which include an upper and a lower ring, the lower ring being secured to the interior upper rim of the adjacent of the cylindrical sections which is lower, and the upper ring being secured to the exterior lower rim of the adjacent of the cylindrical sections which is above said lower cylindrical section, both rings provided with complementary mating bolt bores, and bolts through said mating bores to secure said cylindrical sections together.

2. The pole of claim 1 wherein said lower ring is reinforced by gussets secured both to said lower ring and to the interior wall of the cylindrical section to which said ring is secured, and wherein said upper ring is reinforced by gussets secured both to said upper ring and to the exterior wall of the cylindrical section to what said ring is secured, said gussets being evenly spaced and extending around the circumference of each respective ring.

3. An improved flange for securing two cylindrical sections of a pole of different diameters comprising a ring for each section, the ring of one cylindrical section having a different diameter than the ring of the other cylindrical section, said two rings being adjacent and having commonly spaced bores which complement each other, one said ring having an outer diameter equal to the inner diameter of the larger of said cylindrical sections, and the second said ring having an inner diameter equal to the outer diameter of the smaller of said cylindrical sections and an outer diameter approximately equal to the outer diameter of the larger of said cylindrical sections, said bores complementary to the extent that, when said cylindrical sections are mated, said bores correspond for the purpose of inserting securement means therethrough.

4. A cylindrical section of a modular pole which is formed by joining a plurality of sections of incrementally different diameters, wherein one end of said cylindrical section is provided with a first ring through which are bored a plurality of bolt holes, said ring having an interior diameter equal to the exterior diameter of said cylindrical section.

said ring being secured to said cylindrical section.

the other end of said cylindrical section provided with a second ring through which are bored a plurality of bolt holes, said second ring having an exterior diameter equal to the interior diameter of said cylindrical section.

said second ring being secured to said cylindrical section.

5. The cylindrical section of claim 4 further including a plurality of gussets, generally equally spaced around the circumference of each ring, between said bores, adjacent and abutting the walls of said cylindrical section, said gussets being welded to each ring and to the wall of said cylindrical section.

6. The cylindrical section of claim 4 wherein said rings mate with similarly sized and bored rings of adjacent cylindrical sections which abut each end of said cylindrical section.

* * * * *